United States Patent [19]

Jones

[11] Patent Number: 4,759,603

[45] Date of Patent: Jul. 26, 1988

[54] ARRAY OF LIMITED INTERNALLY REFLECTIVE LIGHT GUIDES

[75] Inventor: Carolyn F. Jones, Menlo Park, Calif.

[73] Assignee: Hewlett-Packard Company, Palo Alto, Calif.

[21] Appl. No.: 849,609

[22] Filed: Apr. 8, 1986

[51] Int. Cl.⁴ .............................................. G02B 6/02
[52] U.S. Cl. ............................. 350/96.28; 350/96.10; 355/1
[58] Field of Search ............... 350/96.10, 96.24, 96.25, 350/96.27, 96.28; 250/227, 552; 355/1

[56] References Cited

U.S. PATENT DOCUMENTS

| | | | |
|---|---|---|---|
| 3,056,297 | 10/1962 | Duke | 250/227 X |
| 3,105,150 | 9/1963 | Duke | 250/227 X |
| 4,157,213 | 6/1979 | Phillips | 351/168 |
| 4,422,719 | 12/1983 | Orcutt | 350/96.1 X |

FOREIGN PATENT DOCUMENTS

| | | | |
|---|---|---|---|
| 0561918 | 8/1958 | Canada | 350/96.25 |
| 0094305 | 7/1981 | Japan | 350/96.27 |
| 1118648 | 7/1968 | United Kingdom . | |
| 2112166 | 7/1983 | United Kingdom . | |

Primary Examiner—John Lee
Assistant Examiner—Phan Heartney
Attorney, Agent, or Firm—Douglas A. Kundrat

[57] ABSTRACT

An array of light guides having limited internally reflective wall surfaces allows projection of an array of tightly defined light spots with minimal cross talk between spots. The walls are fabricated from an optically absorptive material and the wall surfaces have an index of refraction which is greater than the index of refraction of the guide channel medium. The dimensions of the array are such that light from an emitter propagates through the channel associated with that emitter while light entering that channel from another emitter is absorbed within the channel walls.

20 Claims, 9 Drawing Sheets

$$r_{PARALLEL} = \frac{\tan^2(\theta_1 - \theta_2)}{\tan^2(\theta_1 + \theta_2)}$$

$$r_{ORTHOGONAL} = \frac{\sin^2(\theta_1 - \theta_2)}{\sin^2(\theta_1 + \theta_2)}$$

$$\tan \theta_B = n_2/n_1$$

ARRAY OF LIMITED INTERNALLY REFLECTIVE LIGHT GUIDES

BACKGROUND AND SUMMARY OF THE INVENTION

In optical scanning systems, such as xerographic copiers, it is often necessary to project an array of light beams onto an image plane. For maximum image resolution the individual spots of light projected onto the image plane should be tightly defined and for maximum signal to noise performance any cross talk between the light beams should be controlled precisely.

Figure 1:
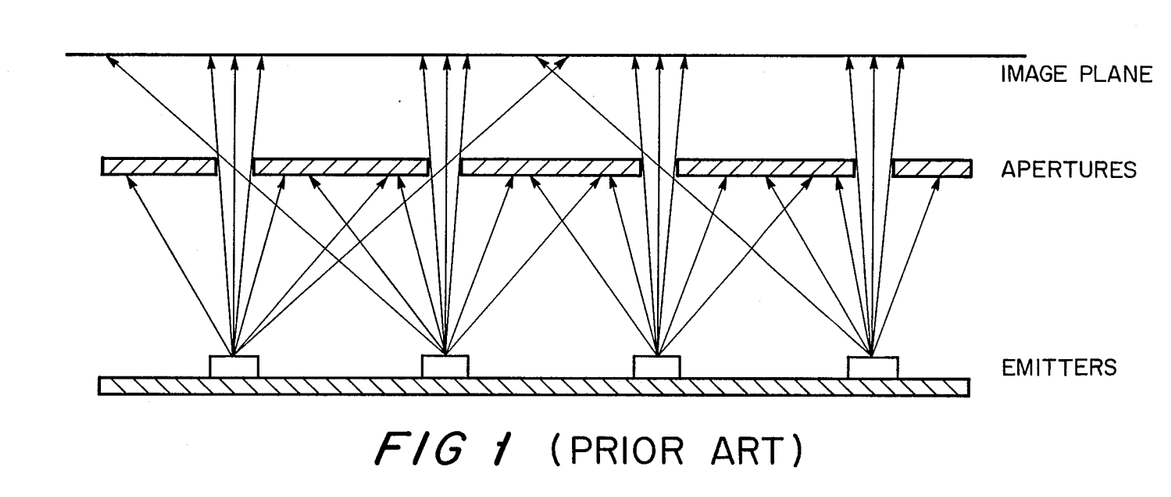
FIG. 1 shows an apertured emitter array which has been used in the prior art.

Apertured emitters, shown in FIG. 1, have been used in the prior art to limit somewhat the cross talk between individual light beams and to define the shape and size of the resultant light spots. Unfortunately, simple apertures severely limit the intensity of the projected light spot since all incoming light beyond the apertures is cut off.

Figure 2:
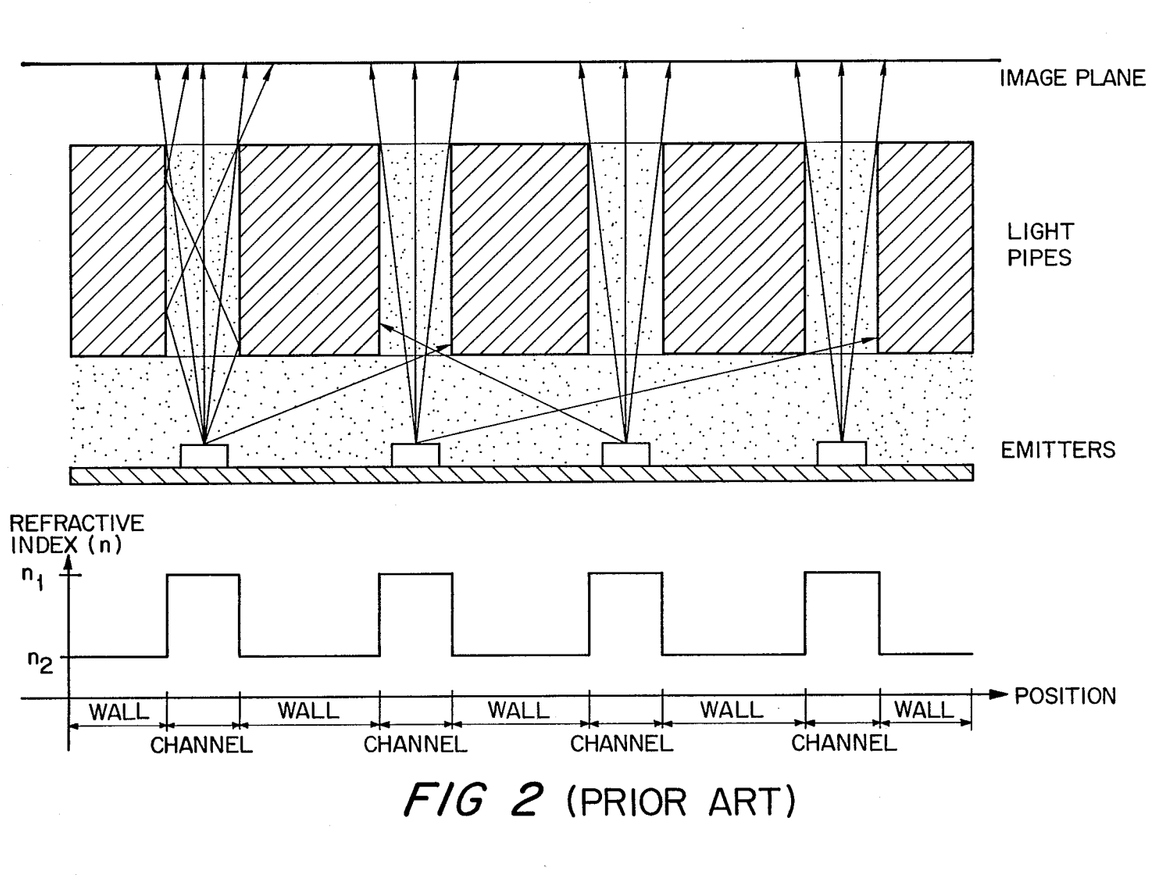
FIG. 2 shows an array of light pipes having $n_1 > n_2$ which has been used in the prior art.

Total internal reflection light guides, such as the light pipes available from Collimated Holes, Inc. and shown in FIG. 2, have also been used in the prior art to project arrays of light spots. The light pipe walls are made from a plastic having a refractive index which is less than the refractive index of the glass light pipe channels ($n_1 > n_2$). Air is not a suitable channel material since the refractive index of air is approximately equal to 1 and selection of a realizable wall material would not be possible. Use of glass channels increases manufacturing complexity and light pipe cost. In order to minimize reflection at the bottom of the channels, the emitters are encapsulated in silicone which further increases light pipe cost while decreasing reliability.

Graded refractive index rod lenses, such as those manufactured by Nippon Sheet Glass Company, Ltd., provide improved light spot shaping and sizing. Unfortunately, these lenses are very expensive and have poor optical efficiency relative to light pipes.

In accordance with the illustrated preferred embodiment of the present invention an inexpensive array of limited internally reflective light guides projects an array of tightly defined light spots with minimum cross talk. The walls of the light guides are optically opaque and the wall surfaces have an index of refraction which is greater than the index of refraction of the guide channels ($n_1 < n_2$). Light which hits a wall surface at an angle between 90° (from the normal relative to the wall) and Brewster's angle tends to be reflected and propagated through the light guide channel toward the image plane. Light which hits a wall surface at an angle from the normal which is less than Brewster's angle tends to be refracted into the wall where it is absorbed since reflectivity at such an angle is low. Thus, cross talk due to light entering an undesired adjacent channel is reduced without attenuation of the desired light beam and spot definition may be tightly controlled since the limited reflectivity of the walls angularly constrains the exiting light beam. In addition, since an air channel is possible, manufacturing costs are minimized and reliability is increased.

DETAILED DESCRIPTION OF THE PREFERRED EMBODIMENT

FIG. 1 shows a prior art array of apertured emitters having good spot definition although with poor cross talk performance and restricted spot intensity. FIG. 2 shows a prior art array of totally internally reflective light guides or light pipes having $n_1 > n_2$.

Figure 3:
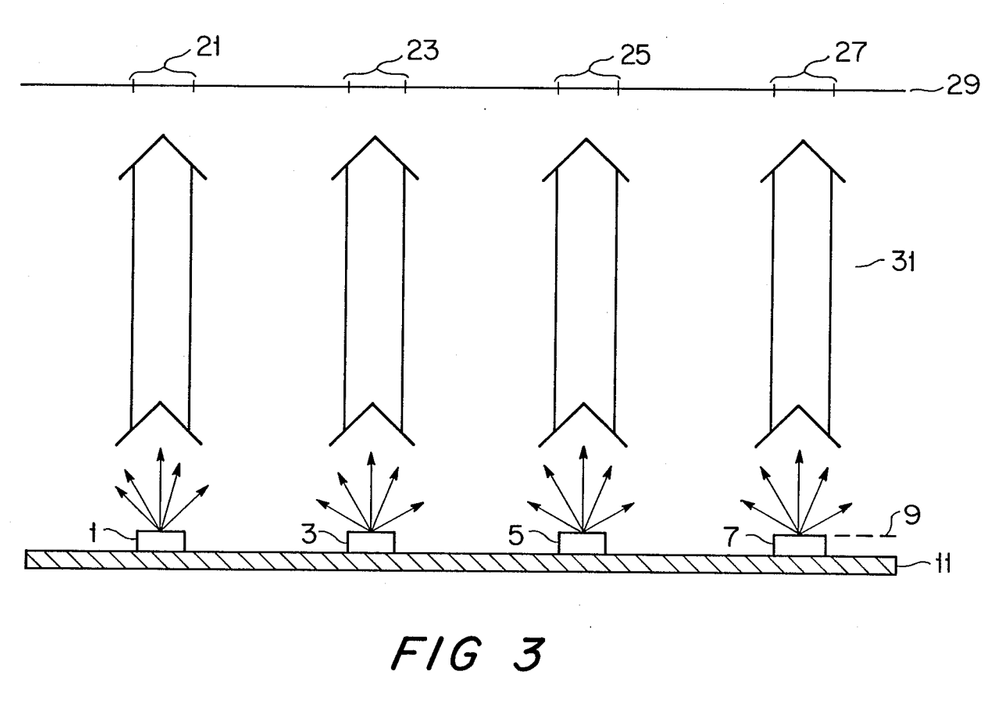
FIG. 3 shows a desired light propagation pattern from an emitter array.

FIG. 3 shows an optimal light propagation pattern. Substrate 11 supports emitters 1-7 which each emit light in a diffuse pattern at a source plane 9. Since tightly defined spots 21-27 are desired on an image plane 29, some means 31 must be provided between the source plane 9 and the image plane 29 to define the individual spots 21-27 and to eliminate cross talk between the spots.

Figure 4:
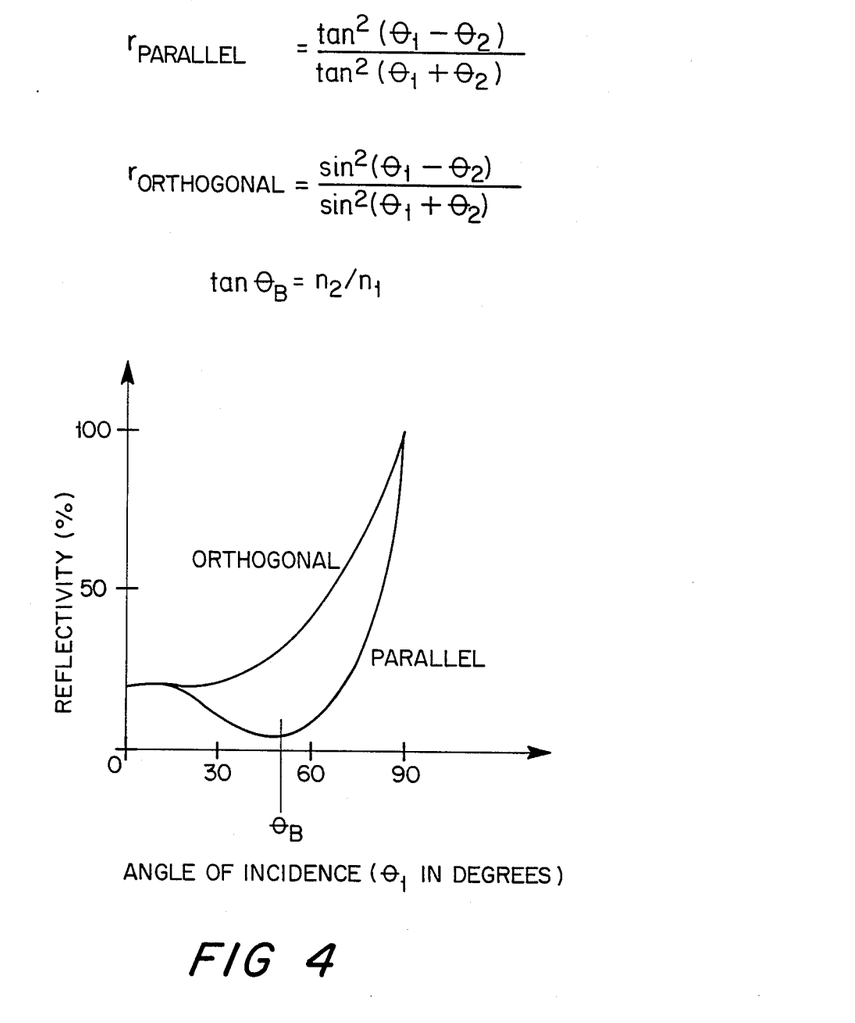
FIG. 4 is a graphical depiction of the relationship between reflectivity and angle of incidence.

FIG. 4 shows the well known relationship between the angle of incidence and reflectivity which is known as the Law of Fresnel reflection. The Law indicates that reflectivity remains relatively constant as the angle of incidence (from the normal) is increased from zero up to Brewster's angle. Above Brewster's angle the reflectivity increases rapidly to a maximum of 100% at 90°. The tangent of Brewster's angle is defined as $n_2/n_1$ where $n_2$ and $n_1$ are the indices of refraction for two media at the reflection interface.

Figure 5:
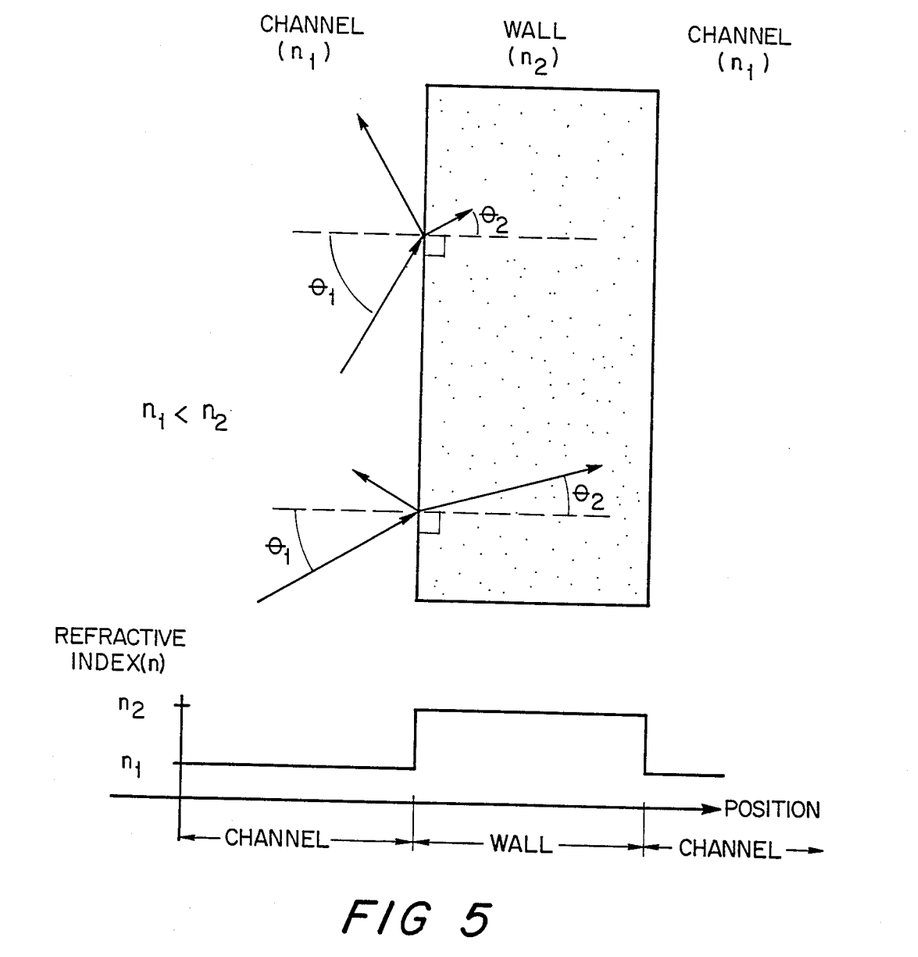
FIG. 5 shows relative reflectivity at two different angles of incidence in a light guide constructed according to the preferred embodiment of the present invention in which $n_1 < n_2$.

FIG. 5 shows two light beams which are reflected at a channel-to-wall interface at which the refractive index ($n_1$) of the channel is less than the refractive index ($n_2$) of the wall. For low angles of incidence relative to the normal a large portion of the incident beam is refracted into the wall and only a smaller portion is reflected as is shown for the lower beam. At high angles of incidence relative to the normal a higher portion of the beam is reflected and only a smaller portion is refracted into the wall as is shown for the upper beam.

Figure 6:
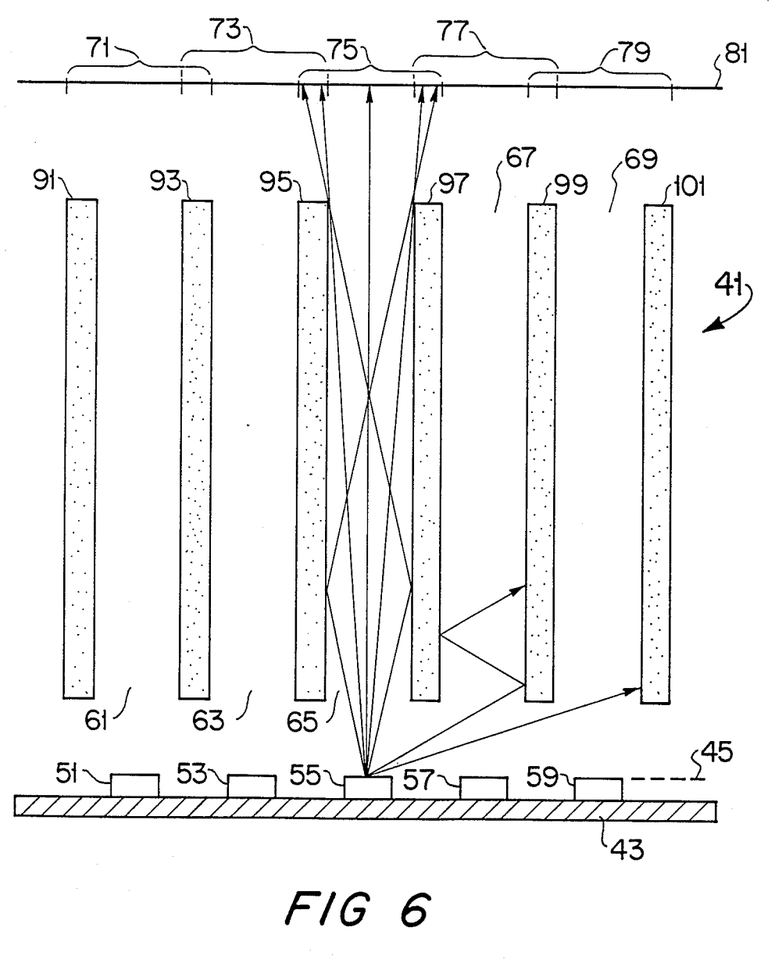
FIG. 6 shows a light guide array which is constructed in accordance with the preferred embodiment of the present invention.
Figure 9:
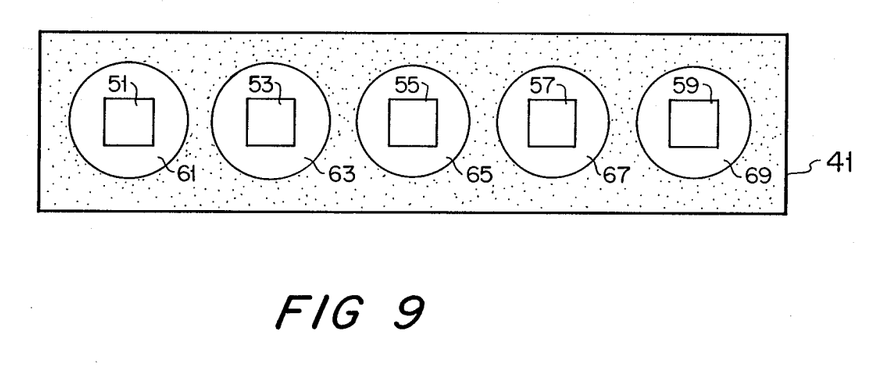
FIG. 9 is a top view of the array shown in FIG. 6.

FIG. 6 shows a five channel array 41 of limited internally reflective light guides in accordance with the preferred embodiment of the present invention. FIG. 9 is a top view of the array 41 with the image plane 81 removed for clarity. As shown in FIG. 6, a substrate 43 supports emitters 51-59 which each emit light at a source plane 45. The emitters 51-59 may comprise any light emitting elements including light emitting diodes such as the Hewlett-Packard Co. HWFR-0522 LEDs which emit light at a wavelength of 655 nanometers. Light from each of emitters 51-59 propagates through each of channels 61-69 to form tightly defined spots 71-79 at an image plane 81. While spots 71-79 are shown as overlapping, the spot definition may be varied to change the spot size as is discussed with reference to FIG. 7. The image plane 81 may comprise any desired surface such as a lens, diffuser screen, reflecting surface, photoreceptor or photosensitive film.

Walls 91-101 define the chanels 61-69 and thereby define the propagation paths of the light beams directed toward spots 71-79. Selection of the wall material and fabrication of the walls to define the channels is critical to performance of the array 41. The wall material must provide adequate mechanical rigidity and must also meet the optical criteria of refractive index and absorptivity. The refractive index of the walls ($n_2$) must be greater than the refractive index ($n_1$) of the channels which may be filled with air or silicone or some other optically transmissive material. The relationship of $n_1$ and $n_2$ may also be varied to obtain optimal design parameters as discussed with reference to FIG. 7. In addition, the optical absorptivity of the wall material must be sufficiently high that light refracted into the wall material will be substantially absorbed.

Aluminum is a very convenient material from which to fabricate the array 41. The metal is rigid and easily machined and has sufficient absorptivity ($\alpha$) that the wall thickness (d) may be kept thin without causing cross talk to occur. In addition, the aluminum wall surfaces are easily coated by, e.g., dipping, sputtering, anodizing or evaporation, to provide the desired surface refractive index ($n_2$). For example, the wall surfaces may easily be anodized to an $Al_2O_3$ surface thickness of a few wavelengths to provide a refractive index of approximately 1.8. Alternatively, it should be possible to fabricate the array from a plastic material containing a carbon filler to increase absorptivity. Since transmission through a wall is related both to wall thickness (d) and to absorptivity ($\alpha$) by the relationship $I_{out} = I_{in} e^{-\alpha d}$, wall thickness and carbon amount may be varied to achieve a desired level of cross talk suppression. Resultant cross talk also decreases as the number of reflections in the adjacent channel increases.

FIG. 6 also shows propagation paths of diffuse light generated by the emitter 55. Light from emitter 55 which enters channel 65 either propagates directly through channel 65 or else hits the surfaces of walls 95, 97 one or more times and is reflected down the channel 65 to the spot 75. Since the angles of incidence of any light from emitter 55 against walls 95, 97 are between Brewster's angle and 90° from the normal, only a small portion is refracted into walls 95, 97 and the vast majority is reflected and therefore propagates toward spot 75. The light from emitter 55 propagating through channel 65 forms the tightly defined spot 75 on the image plane 81.

For manufacturing ease a not insubstantial gap exists between the bottoms of walls 91-101 and the source plane 45 with the result that a portion of the light from emitter 55 enters adjoining channels 61, 63, 67 and 69. But, the angle of incidence from the normal of any light from emitter 55 against the walls of these other channels is less than Brewster's angle. Therefore, a substantial portion of the light is refracted into the wall and absorbed each time the light hits a wall. Since multiple reflections would be required for propagation through these other channels and since more light is absorbed than reflected each time the light hits a wall, virtually none of the light propagates through these other channels. Thus, cross talk is minimized.

Figure 7:
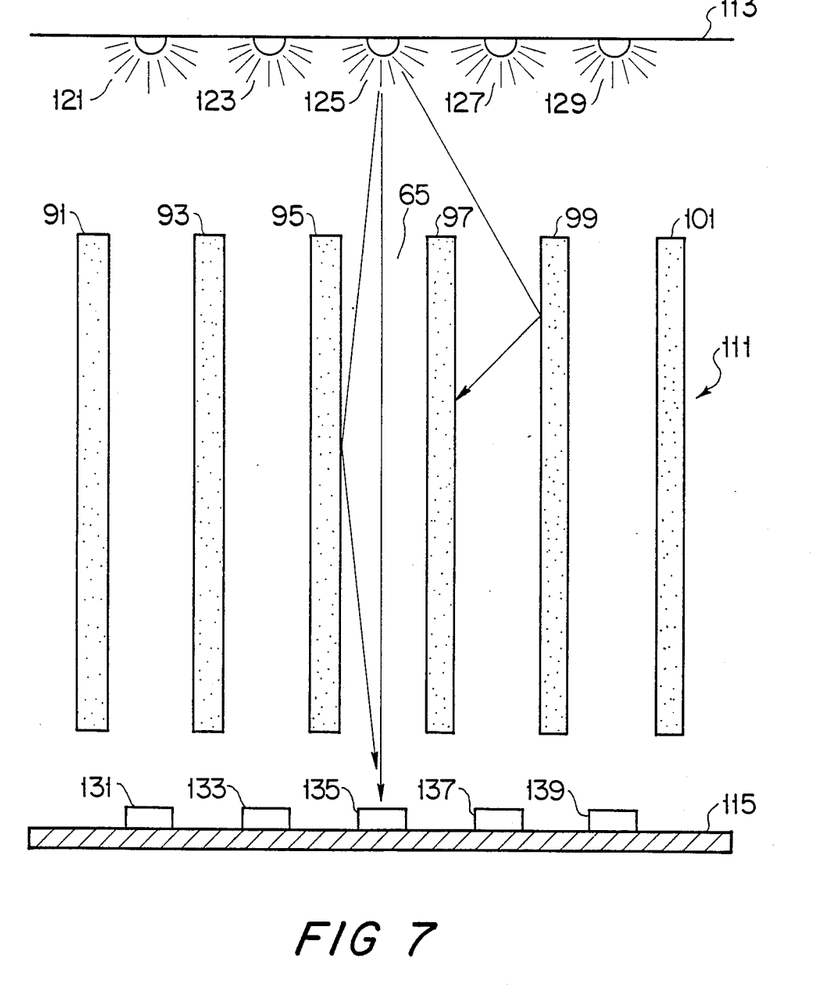
FIG. 7 shows a light guide array according to an alternate preferred embodiment of the present invention in which the positions of the source and image planes are reversed.

As shown in FIG. 7, it is possible to use the array 41 (of FIG. 6) with the image and source planes reversed to create a limited internally reflective light guide array 111 for use as a detector. The source plane 113 includes emitters which may be discrete LEDs 121-129. Alternatively, the source plane could be a diffuse light source such as a photocopier reflective sheet. Detectors 131-139 may comprise, e.g., photodetectors such as the HP PIN photodiode 5082-4200 available from Hewlett-Packard Company.

Figure 8:
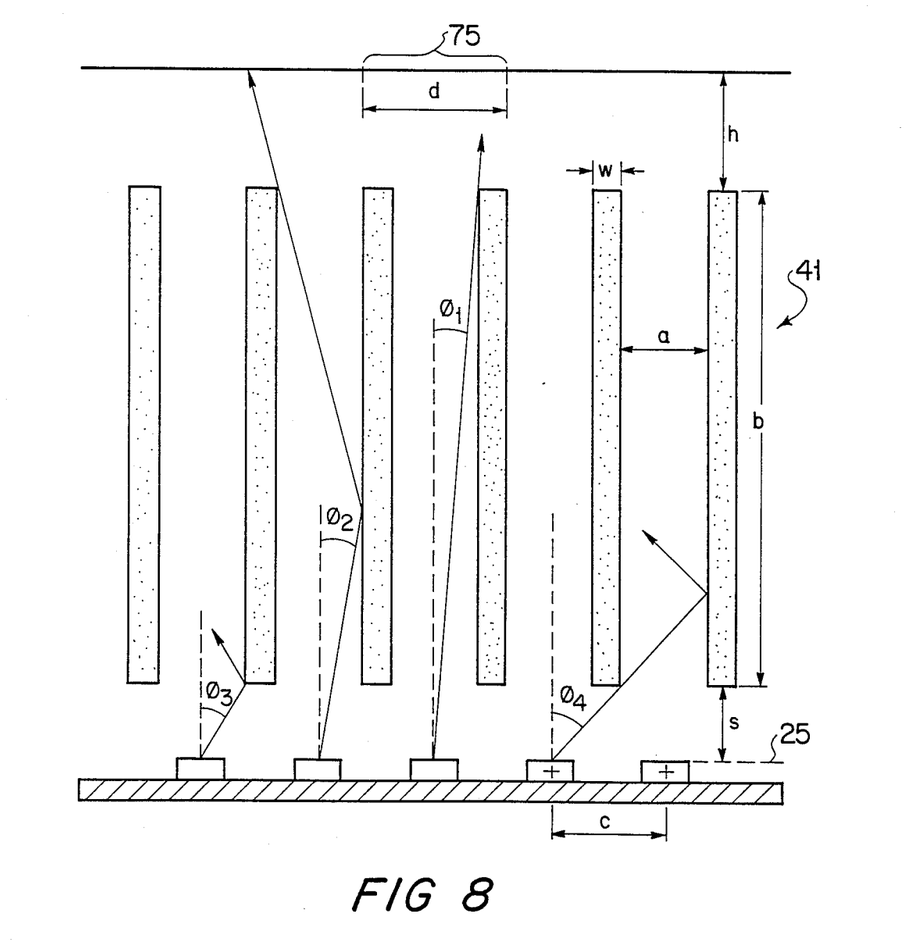
FIG. 8 shows various design parameters of the array shown in FIG. 6.

FIG. 8 shows various design parameters which are important in the fabrication of the array 41. For optimum performance, the relationship $\phi_2 < \phi_B < \phi_4$ should be met. By simple geometry, this relationship reduces to:

$$\frac{3a}{2(b+s)} < n_1/n_2 < \frac{a+2w}{2s}$$

since $\phi_B = \tan^{-1}(n_2/n_1)$. In the near field situation, where the image plane 81 is near the array 41 and $h/(b+s)$ is small, a simple optimum design would be to have the primary beam and the single reflection beams ($\phi < \phi_2$) be spatially superimposed within the desired width d of the spot 75 on the image plane 81. This requirement reduces to $a/(b+s) = d/(b+s+h)$ with the requirement that $h/(b+s)$ must be as small as possible. Confinement of the spot 75 within a tolerable error $\Delta d/2 = ah/2(b+s)$ may be made by holding $\phi_3 < \phi_2$ and requiring that $(h+b+s) \tan \phi_3 = a+d/2$. This requirement can be reduced to $s = b/2$ for the near field case in which $h/(b+s)$ is small.

In the far field situation, the spot 75 on the image plane 81 is defined by the primary beam ($\phi \leq \phi_1$). Therefore, $(h+b+s) \tan \phi_1 = d/2$ so the requirement that $a/(b+s) = d/(b+s+h)$ exists. Beam spread at the image plane 81 may be confined by keeping $\phi_3 < \phi_2$ and requiring that $(h+b+s) \tan \phi_3 = d/2 + a$. The uniformity of the intensity profile at the image plane 81 may be optimized by requiring that the reflected beams meet but do not overlap: $a = (h+b+s) \tan \phi_1$. The combination of these requirements indicates that for an optimum far field design, the following conditions should be met: $a = d/2$, $s = h/2$, $b = h/2$ and $(h+b+s) = 2h$.

In the example described above of a linear array 41 at a density of 50 pixels per inch a wall material of anodized aluminum and Hewlett-Packard Company model HWFR-0522 light emitting diodes were used to obtain spots having 0.025 inch diameters. In this example, the air channel refractive index ($n_1$) was approximately 1.0 and the wall refractive index ($n_2$) was approximately 1.8. The emitter center to center spacing (c) was 0.020 inch and the wall to source plane spacing (s) was 0.010 inch. The wall height (b) was 0.080 inch, the channel width (s) was 0.015 inch, the image plane to wall spacing (h) was 0.020 inch and the wall thickness (w) was 0.005 inch.

I claim:

1. A light guide array for transmitting light to an image plane from one or more emitters located on a source plane, the array comprising:
    a plurality of light guides positionable between the source and image planes;
    each light guide having a light transmissive channel of refractive index $n_1$ formed within a wall material having interior wall surfaces of refractive index $n_2$; and
    wherein $n_2$ is greater than $n_1$.

2. An array as in claim 1, wherein the wall material is optically opaque.

3. A light guide array for transmitting light from one or more emitters located on a source plane to form one or more spots on an image plane, the array comprising:
  a plurality of light guides positioned between the source and image planes, each light guide being longitudinally aligned with an associated emitter across an emitter gap, s, and having a light transmissive channel of diameter a and refractive index $n_1$ formed within an optically opaque wall material having interior wall surfaces of refractive index $n_2$ greater than $n_1$;
  a wall thickness, w, of wall material separating adjacent channels; and
  wherein $(n_1/n_2) < (a+2w)/(2s)$ such that light entering a channel from an emitter other than its associated emitter impinges on the walls of the channel at angles from the normal which are less than Brewster's angle.

4. An array as in claim 3, wherein:
  each channel has a length, b; and wherein
  $$\frac{3a}{2(b+s)} < n_1/n_2 < \frac{a+2w}{2s}.$$

5. An array as in claim 3, wherein:
  the array is positionable near the image plane;
  each channel has a length, b; and
  wherein s is substantially equal to b/2.

6. An array as in claim 3, wherein:
  the array is positionable at a far distance, h, from the image plane;
  each channel has a length b;
  each spot has a nominal diameter, d; and
  wherein a is substantially equal to d/2, s is substantially equal to h/2 and b is substantially equal to h/2.

7. An array as in claim 3, wherein:
  the wall material comprises a single piece of aluminum; and each channel and emitter gap is air filled.

8. An array as in claim 7, wherein each emitter comprises a light emitting diode.

9. An array as in claim 8, wherein the wall surface comprises sapphire.

10. An array as in claim 3, wherein:
  the wall material comprises a single piece of aluminum; and
  each channel and emitter gap is filled with silicone.

11. A light guide array for transmitting light from a diffuse source located on a source plane to a plurality of individual spots on an image plane, comprising:
  a plurality of light guides positionable between the source and image planes;
  each light guide having a light transmissive channel of refractive index $n_1$ formed within a wall material having interior wall surfaces of refractive index $n_2$; and
  wherein $n_2$ is greater than $n_1$.

12. An array as in claim 11, wherein the wall material is optically opaque.

13. A light guide array for transmitting light from a diffuse source located on a source plane to form a plurality of spots on an image plane, comprising:
  a plurality of light guides positioned between the source and image planes, each light guide being longitudinally aligned with an associated spot across a spot gap, s, and having a light transmissive channel of diameter a and refractive index $n_1$ formed within an optically opaque wall material having interior wall surfaces of refractive index $n_2$ greater than $n_1$;
  a wall thickness, w, of wall material separating adjacent channels; and
  wherein $(n_1/n_2) < (a+2w)/(2s)$ such that light entering a channel from an area on the source plane not longitudinally aligned with the channel impinges on the walls of the channel at angles from the normal which are less than Brewster's angle.

14. An array as in claim 13, wherein: each channel has a length, b; and wherein
  $$\frac{3a}{2(b+s)} < n_1/n_2 < \frac{a+2w}{2s}.$$

15. An array as in claim 13, wherein:
  the wall material comprises a single piece of aluminum; and each channel and spot gap is air filled.

16. An array as in claim 15, wherein a photodetector is positioned at each spot on the image plane.

17. An array as in claim 15, wherein the wall surface comprises sapphire.

18. An array as in claim 13, wherein:
  the wall material comprises a single piece of aluminum; and each channel and spot gap is filled with silicone.

19. An array as in claim 13, wherein:
  the array is positionable near the image plane;
  each channel has a length, b; and
  wherein s is substantially equal to b/2.

20. An array as in claim 13, wherein:
  the array is positionable at a far distance, h, from the image plane;
  each channel has a length b;
  each spot has a nominal diameter, d; and
  wherein a is substantially equal to d/2, s is substantially equal to h/2 and b is substantially equal to h/2.

* * * * *